US012728568B2

(12) United States Patent
Rangan et al.

(10) Patent No.: US 12,728,568 B2
(45) Date of Patent: Sep. 8, 2026

(54) DEBAGGING SYSTEM AND METHOD FOR USE IN A DEBAGGING PROCESS DURING THE MANUFACTURE OF A WIND TURBINE BLADE

(71) Applicant: LM Wind Power A/S, Kolding (DK)

(72) Inventors: Balaji Rangan, Bengaluru (IN); Akhilesh Mishra, Bengaluru (IN)

(73) Assignee: LM Wind Power A/S, Kolding (DK)

( * ) Notice: Subject to any disclaimer, the term of this patent is extended or adjusted under 35 U.S.C. 154(b) by 98 days.

(21) Appl. No.: 18/706,488

(22) PCT Filed: Nov. 2, 2022

(86) PCT No.: PCT/EP2022/080517
§ 371 (c)(1),
(2) Date: May 1, 2024

(87) PCT Pub. No.: WO2023/078905
PCT Pub. Date: May 11, 2023

(65) Prior Publication Data

US 2025/0010525 A1 Jan. 9, 2025

(30) Foreign Application Priority Data

Nov. 2, 2021 (EP) .................................... 21205901

(51) Int. Cl.
*B29C 33/50* (2006.01)
*B29C 37/00* (2006.01)
(Continued)

(52) U.S. Cl.
CPC .......... *B29C 37/0003* (2013.01); *B29C 70/44* (2013.01); *B29L 2031/085* (2013.01)

(58) Field of Classification Search
CPC ... B29C 70/386; B29C 70/544; B29C 70/549; B29C 2043/3644; B29C 2043/3647; B29C 2043/3655; B29C 33/50
See application file for complete search history.

(56) References Cited

U.S. PATENT DOCUMENTS 352,049 A * 11/1886 Eastin ........................ B41F 3/46
101/260
4,033,573 A * 7/1977 Wortman ............. B65H 45/103
226/188
(Continued)

FOREIGN PATENT DOCUMENTS

WO WO2019/212588 A1 11/2019

OTHER PUBLICATIONS

European Search Report EP21205901.8 on 14APR2022.
PCT ISR PCT/EP2022/0805 on 17FEB2023.

*Primary Examiner* — Matthew J Daniels
(74) *Attorney, Agent, or Firm* — Dority & Manning, P.A.

(57) ABSTRACT

A debagging system (100) for use in a debagging process during the manufacture of a wind turbine blade is provided. The debagging system comprises: a debagging tool (110, 210), and conveying means configured to moving the debagging tool along a longitudinal direction of a mould for manufacturing a wind turbine blade part. The debagging tool (110, 210) comprises: a lifting bar (112, 212) for insertion under infusion tools (50) and lifting the infusion tools (50) during the debagging process, the lifting bar (112, 212) having a first end and a second end, and a support frame (120, 220) for carrying the lifting bar, wherein the lifting bar (112, 212) is coupled to the support frame (120, 220), and wherein the debagging tool is suspended from the conveying means so that the debagging tool during use can be arranged above the mould and be moved along the longitudinal direction of the mould.

13 Claims, 6 Drawing Sheets

(51) Int. Cl.

| | |
|---|---|
| *B29C 70/44* | (2006.01) |
| *B29L 31/08* | (2006.01) |

(56) References Cited

U.S. PATENT DOCUMENTS

| | | | | |
|---|---|---|---|---|
| 4,750,965 | A * | 6/1988 | Pippel | G05B 19/41 156/577 |
| 5,445,426 | A * | 8/1995 | Sorensen | B66C 1/10 294/81.5 |
| 2005/0191146 | A1* | 9/2005 | Toye | B60P 7/12 410/48 |
| 2007/0187026 | A1* | 8/2007 | Burgess | B29C 70/386 156/574 |
| 2012/0261864 | A1* | 10/2012 | Schibsbye | B29C 70/443 264/511 |
| 2013/0323347 | A1* | 12/2013 | Itani | B29C 33/442 425/385 |

* cited by examiner 210
212
214
220
222
224
226
227
228
230
232
240
242
250
252
254
260
270
275

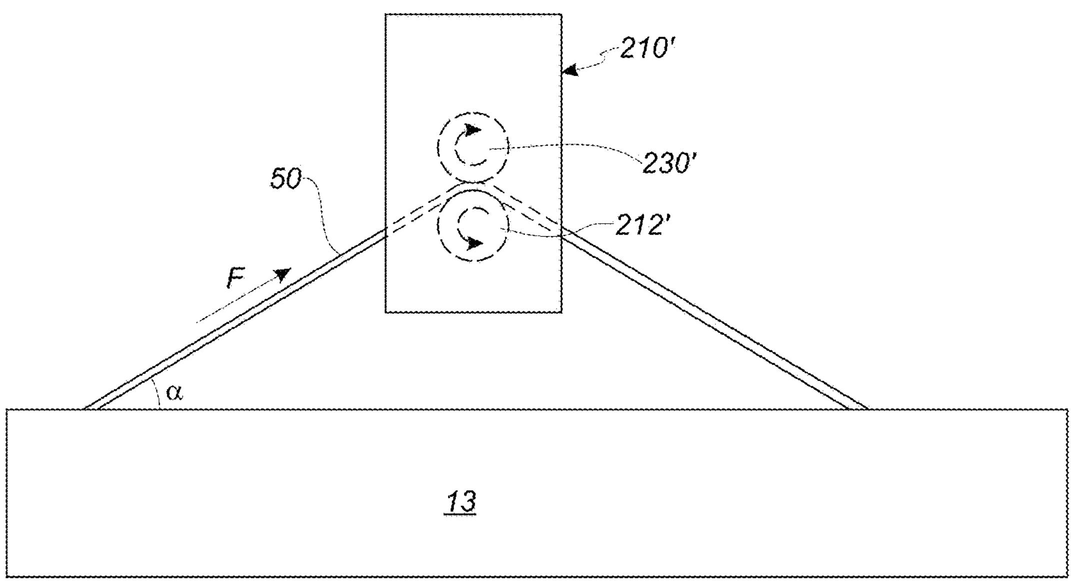

Fig. 9

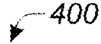

| 402 proving a mould for manufacturing the wind turbine blade part |
|---|
| 404 arranging fibre reinforcement material on a mould surface of the mould |
| 406 arranging infusion tools on top of the fibre reinforcement material, the infusion tools comprising a vacuum bag |
| 408 sealing the vacuum bag against the mould to form a mould cavity |
| 410 supplying resin into the mould cavity |
| 412 curing the resin to form the wind turbine blade part |
| 300 carrying out the debagging process |

Fig. 11

DEBAGGING SYSTEM AND METHOD FOR USE IN A DEBAGGING PROCESS DURING THE MANUFACTURE OF A WIND TURBINE BLADE

RELATED APPLICATIONS

The present application claims priority to PCT Application Serial Number PCT/EP2022/080517, filed Nov. 2, 2022, which claims priority to EP Application Serial No. 21205901.8, filed Nov. 2, 2021. Both applications are incorporated by reference herein in their entirety.

FIELD OF THE INVENTION

The present invention relates to a debagging system for use in a debagging process during the manufacture of a wind turbine blade. The invention also relates to a debagging tool that is part of the debagging system. Further, the invention relates to a method for debagging infusion tools during the manufacture of a wind turbine blade part in a mould for manufacturing the wind turbine blade part. Finally, the invention relates to a method of manufacturing a wind turbine blade part, which involves the debagging method.

BACKGROUND OF THE INVENTION

Wind turbine blades are often manufactured according to one of two constructional designs, namely a design where a thin aerodynamic shell is glued onto a spar beam, or a design where spar caps, also called main laminates, are integrated into the aerodynamic shell.

In the first design, the spar beam constitutes the load bearing structure of the blade. The spar beam as well as the aerodynamic shell or shell parts are manufactured separately. The aerodynamic shell is often manufactured as two shell parts, typically as a pressure side shell part and a suction side shell part. The two shell parts are glued or otherwise connected to the spar beam and are further glued to each other along a leading edge and a trailing edge of the shell parts. This design has the advantage that the critical load carrying structure may be manufactured separately and therefore easier to control. Further, this design allows for various different manufacturing methods for producing the beam, such as moulding and filament winding.

In the second design, the spar caps or main laminates are integrated into the shell and are moulded together with the aerodynamic shell. The main laminates typically comprise a high number of fibre layers compared to the remainder of the blade and may form a local thickening of the wind turbine shell, at least with respect to the number of fibre layers. Thus, the main laminate may form a fibre insertion in the blade. In this design, the main laminates constitute the load carrying structure. The blade shells are typically designed with a first main laminate integrated in the pressure side shell part and a second main laminate integrated in the suction side shell part. The first main laminate and the second main laminate are typically connected via one or more shear webs, which for instance may be C-shaped or I-shaped. For very long blades, the blade shells further along at least a part of the longitudinal extent comprise an additional first main laminate in the pressure side shell, and an additional second main laminate in the suction side shell. These additional main laminates may also be connected via one or more shear webs. This design has the advantage that it is easier to control the aerodynamic shape of the blade via the moulding of the blade shell part.

Vacuum infusion or VARTM (vacuum assisted resin transfer moulding) is one method, which is typically employed for manufacturing composite structures, such as wind turbine blades comprising a fibre reinforced matrix material.

During the process of filling the mould, a vacuum, said vacuum in this connection being understood as an under-pressure or negative pressure, is generated via vacuum outlets in the mould cavity, whereby liquid polymer is drawn into the mould cavity via the inlet channels in order to fill said mould cavity. From the inlet channels the polymer disperses in all directions in the mould cavity due to the negative pressure as a flow front moves towards the vacuum channels. Thus, it is important to position the inlet channels and vacuum channels optimally in order to obtain a complete filling of the mould cavity.

In most cases the polymer or resin applied is polyester, vinyl ester or epoxy, but may also be PUR or pDCPD, and the fibre reinforcement is most often based on glass fibres, carbon fibres, or a mixture hereof. Epoxies have advantages with respect to various properties, such as shrinkage during curing (which in some circumstances may lead to less wrinkles in the laminate), electrical properties and mechanical and fatigue strengths. Polyester and vinyl esters have the advantage that they provide better bonding properties to gelcoats. Thereby, a gelcoat may be applied to the outer surface of the shell during the manufacturing of the shell by applying a gelcoat to the mould before fibre-reinforcement material is arranged in the mould. Thus, various post-moulding operations, such as painting the blade, may be avoided. Further, polyesters and vinyl esters are cheaper than epoxies. Consequently, the manufacturing process may be simplified, and costs may be lowered.

Often the composite structures comprise a core material covered with a fibre reinforced material, such as one or more fibre reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

Resin transfer moulding (RTM) is a manufacturing method, which is similar to VARTM. In RTM the liquid resin is not drawn into the mould cavity due to a vacuum generated in the mould cavity. Instead, the liquid resin is forced into the mould cavity via an overpressure at the inlet side.

Prepreg moulding is a method in which reinforcement fibres are pre-impregnated with a pre-catalysed resin. The resin is typically solid or near-solid at room temperature. The prepregs are arranged by hand or machine onto a mould surface, vacuum bagged and then heated to a temperature, where the resin is allowed to reflow and eventually cure. This method has the main advantage that the resin content in the fibre material is accurately set beforehand. The prepregs are easy and clean to work with and make automation and labour saving feasible. The disadvantage with prepregs is that the material cost is higher than for non-impregnated fibres. Further, the core material needs to be made of a material, which is able to withstand the process temperatures needed for bringing the resin to reflow. Prepreg moulding may be used both in connection with an RTM and a VARTM process.

Further, it is possible to manufacture hollow mouldings in one piece by use of outer mould parts and a mould core. Such a method is for instance described in EP 1 310 351 and may readily be combined with RTM, VARTM and prepreg moulding.

Common for the various moulding techniques is that a number of tools are arranged on top of the mould and the material that is to be infused with resin and that needs to be removed after the resin has cured in order to form the composite structure of the wind turbine blade. Such tools include resin inlets, vacuum outlets, vacuum bag, and other infusion media. These tools are often arranged on top of a peel ply, a release film, or a similar tear-off layer, which in turn is arranged on top of the material arranged in the mould cavity, such that all tools can be removed together from the composite structure after the resin has cured. This process is often called the debagging process. Afterwards, required post-moulding operations can be carried out.

The debagging process is typically carried out manually, which is a tedious process, and which can entail unsafe conditions and acts. The tools are quite heavy, and it requires strength to manually remove the tools. In addition, it may not be possible to remove all tools at once. Instead, the vacuum bag may have to be removed first, then the release film or peel ply together with the resin inlets, vacuum outlets, and other infusion tools. Often 7-10 workers are involved in removing the tools, which may even require the workers to stand on the manufactured structure, e.g. the wind turbine blade shell, which in turn may introduce mechanical defects to the structure. Further, the workers face several potential hazards and ergonomic issues, such as risks of slipping, knee pain, strain to the hand, fingers, or back, and so forth.

Accordingly, there is a need for new tools and methods for use in the debagging process.

SUMMARY OF THE INVENTION

It is an object of the invention to obtain a method, system, and tool, which overcome or ameliorate at least one of the disadvantages of the prior art or which provide a useful alternative.

According to a first aspect, there is provided a debagging system for use in a debagging process during the manufacture of a wind turbine blade, wherein the debagging system comprises: a debagging tool, and conveying means configured to move the debagging tool along a longitudinal direction of a mould for manufacturing a wind turbine blade part. The debagging tool comprises: a lifting bar for insertion under infusion tools and lifting the infusion tools during the debagging process, the lifting bar having a first end and a second end, and a support frame for carrying the lifting bar, wherein the lifting bar is coupled to the support frame, and wherein the debagging tool is suspended from the conveying means so that the debagging tool during use can be arranged above the mould and be moved along the longitudinal direction of the mould.

According to a second aspect, there is provided a debagging tool for use in a debagging process during the manufacture of a wind turbine blade, wherein the debagging tool comprises: a lifting bar for insertion under infusion tools and lifting the infusion tools during the debagging process, the lifting bar having a first end and a second end, and a support frame for carrying the lifting bar, wherein the lifting bar is coupled to the support frame.

According to a third aspect, there is provided a method for debagging infusion tools during the manufacture of a wind turbine blade part in a mould for manufacturing the wind turbine blade part, wherein the method comprises the steps of: inserting a lifting bar of a debagging tool under the infusion tools; moving the debagging tool along a longitudinal direction of the mould in order for the lifting bar to peel the infusion tools from the wind turbine blade part; and removing the infusion tools from the mould.

According to a fourth aspect, there is provided a method of manufacturing a wind turbine blade part, e.g., a wind turbine blade shell or a spar cap, wherein the method comprises the steps of: proving a mould for manufacturing the wind turbine blade part; arranging fibre reinforcement material on a mould surface of the mould; arranging infusion tools on top of the fibre reinforcement material, the infusion tools comprising a vacuum bag; sealing the vacuum bag against the mould to form a mould cavity; supplying resin into the mould cavity; curing the resin to form the wind turbine blade part; and carrying out a debagging process according to the third aspect.

Thereby, a simple debagging system and debagging tool are provided that can be utilised to be moved along a mould for manufacturing e.g., a wind turbine blade shell part and peel the infusion tools from the finished moulded structure, such as a wind turbine blade shell. This can ameliorate or at least decrease the need for manual work in the debagging process and may further speed up the debagging process. Similarly, the method for debagging infusion tools during the manufacture of a wind turbine blade part may reduce the need for manual work in the debagging process.

In the following, there is referred to infusion tools. But in general, it is understood that the specification refers to the disposable tools that are used in the infusion process and that do not become part of the product.

Further, the wind turbine blade part is preferably a wind turbine blade shell part, such as an upwind or downwind wind turbine blade shell, alternatively a spar cap for the wind turbine blade.

In the following, advantageous and preferred embodiments are described which can be utilised with any of the first, second, third, and fourth aspect.

According to a preferred embodiment, the lifting bar comprises a first roller. Thereby, the debagging tool can more easily be moved along the mould and used for the debagging process, because the first roller rotates as the debagging tool is moved along the mould and debagging tools. Preferably, the first roller is connected to a first drive or motor for driving the first roller. Thus, the roller can actively be used for asserting a force to the infusion tools and assist in peeling the infusion tools from the finished moulded structure. The first roller may advantageously be configured to be driven in both a first direction and a second, opposite direction. Accordingly, the first roller may be used for both asserting a force in a first direction and a second direction. Thereby, the first roller can also be used for first peeling the infusion tools from the finished moulded structure and later removing the infusion tools from the mould. A surface of the first roller may advantageously be provided with gripping means, e.g., by providing a rough surface or a ridged, fluted, or grooved surface. Thereby, the roller can add grip to the engagement with the infusion tools, which in turn assist in asserting the peeling force to the infusion tools.

According to a preferred embodiment, the lifting bar is coupled to the support frame at the first end and at the second end of the lifting bar. This provides a simple solution for carrying the lifting bar and making sure that the infusion tools can fit over the lifting bar.

The support frame preferably comprises attachment means, such as attachment ears, for attaching the debagging tool to conveying means, such as an overhead crane or a gantry. This provides simple means for attaching the debagging tool to for instance an overhead crane or a gantry configured to move along the mould.

According to a preferred embodiment, the support frame comprises a top frame part and a first side frame part and a second side frame part, wherein the first side frame part and second side frame part extend from the top frame part, and wherein the first end of the lifting bar is coupled to the first side frame part, and the second end of the lifting bar is coupled to the second side frame part. This provides a simple solution for attaching the lifting bar (e.g., the first roller) to the support frame and ensuring that the width of the infusion tools can be inserted over the lifting bar in a space formed by at least the lifting bar, the two side frames and the top frame.

In one preferred embodiment, the debagging tool further comprises one or more upper support rollers configured to engage with the infusion tools when lifted by the lifting bar, wherein the one or more upper support rollers are coupled to the support frame. This will contribute to guide the infusion tools more efficiently over the lifting bar and may further contribute to asserting a gripping or clamping force on the infusion tools, whereby a pulling force more efficiently can be asserted to the infusion tools. The one or more upper support rollers may also provide with gripping means, e.g., by providing a rough surface or a ridged, fluted, or grooved surface. Preferably, the one or more upper support rollers are arranged and configured to be height adjusted relative to the support frame. Thereby, the one or more upper support rollers are also height adjustable relative to the lifting bar. This provides a simple solution for engaging the infusion tools. The one or more upper support rollers may for instance be height adjustable by one or more motors attached to the support frame and/or by use of spring forces. The height adjustment may also utilise a telescoping arrangement for carrying the one or more upper support rollers. Advantageously, the one or more upper support rollers are connected to one or more second drives or motors for driving the one or more upper support rollers. Thereby, the one or more upper support rollers can also or alternatively be used to assert the pulling force to the infusion tools. Preferably, the one or more are configured to be driven in both a first direction and a second, opposite direction.

According to a preferred embodiment, both the first roller and the one or more upper support rollers are connected to drives or motors. Thereby, the debagging tool will have a built-in redundancy in case one of the drives or motors fail.

In an advantageous embodiment, the support frame further comprises a lower frame part. Preferably, it extends between the first side frame part and the second side frame part, and may be arranged and configured to support the lifting bar. In a preferred embodiment, one or more lower support rollers, such as idler rollers, are mounted on the lower frame part and arranged and configured to support the lifting bar. This provides a simple solution for adding support to the lifting bar, e.g., the first roller, on the support frame.

Advantageously, the width of the lifting bar is at least 3 metres, preferably at least 3.5 metres, and more preferably at least 4 metres. In general, the lifting bar and the system should have a width so that it can be used for debagging the infusion tools at the place where the mould and moulded structure is widest. For a wind turbine blade shell part, this position is the position, where the wind turbine blade is to have the widest chord, e.g., at the shoulder of the wind turbine blade.

In a preferred embodiment, the conveying means comprise an overhead crane or gantry. An overhead crane from the factory may for instance be used. However, it is also possible to use a separate gantry that can be moved along the mould. It may for instance be possible to use the fibre material wagon or gantry that can be used for laying up fibre material in the mould. The debagging tool may be a separate module that can be attached to the overhead crane or the fibre material wagon, e.g., replacing a layup head.

In a preferred embodiment, the debagging system is configured to provide a pulling force in a direction that forms an angle of 30-60 degrees compared to a mould surface of the mould. Equivalently, the pulling force direction may be 30-60 degrees compared to a horizontal plane, e.g., the factory floor. The direction of the pulling force may be provided by the height at which the debagging tool is moved along the mould. Accordingly, the debagging system should be configured and operational to convey the debagging tool along the mould at a height above the mould surface to provide a pulling force within this angle interval. The speed with which the debagging tool is moved along the mould and the speed of the roller or rollers that assert the pulling force can also attribute to achieving the desired pulling angle.

In an advantageous embodiment, the debagging system is provided with a tilt sensor to monitor the inclination or tilt of the debagging tools relative to a mould surface of the mould. Equivalently, the tilt sensor may be configured to measure the tilt angle of the debagging tool relative to a vertical plane. The tilt angle may for instance be compared to a central axis through the debagging tool. The tilt sensor may be provided in form of an inclinometer, accelerometers, gyros, or the like. This ensures that the debagging tool may be maintained in an acceptable orientation relative to the surface of the mould and in turn ensure that the correct pulling force and direction may be maintained. The debagging system may be configured to maintain the debagging tool at a tilt angle being below a threshold angle compared to a vertical plane, preferably the system being configured to keep the tilt angle below 5 degrees or even below 3 degrees, more preferably below 2 degrees, and even more preferably below 1.5 degrees.

The system may be configured to provide an alarm if the threshold angle is exceeded. The system may also be provided with a feedback system that ensures that the system is maintained below the threshold value, e.g. by lowering the speed of conveying or the speed of the motor.

Similar systems can be implemented to monitor other parameter, such as the rotation angle of the tool relative to a transverse plane of the mould.

The debagging system preferably further comprises a clamping device for clamping a part, preferably an end part, of the infusion tools to the mould. Thereby, the clamping device may assert a clamping force to retain for instance an end of the infusion tools during the debagging process, such that a peeling force more easily can be asserted to the infusion tools.

In another embodiment, the debagging system further comprises a cutting device for cutting the infusion tools to divide the infusion tools into separate disposable parts. Accordingly, the infusion tools may de divided into smaller parts as it is removed from the mould. The system may additionally comprise a container for collecting the separate disposable parts.

The aforementioned method may preferably comprise the step of: prior to inserting the lifting bar of the debagging tool under the infusion tools, peeling a first part of the infusion tools from the wind turbine blade part. This ensures that the lifting bar may be inserted under the infusion tools. Preferably, the first part of the infusion tools is peeled from a root side or a tip side of the mould.

The method may include clamping a longitudinal end of the infusion tools to the mould, e.g., at tip end or root end, and preferably at the first part that has been manually peeled from the finished wind turbine blade part. Thus, a clamping force can be asserted whereby a pulling force more efficiently can be asserted to the infusion tools.

The method preferably includes providing peeling force to the infusion tools, e.g., via one or more rollers and drives. It is clear that the lifting bar may be one of the one or more rollers. It is also clear that the debagging system may be operated so as to provide the peeling force. The peeling force may advantageously be provided in a direction that forms an angle of 30-60 degrees compared to a mould surface of the mould.

In a preferred embodiment, the debagging tool is operated to maintain the peeling force in a first direction, while the debagging tool is moved along the longitudinal direction, and when reaching a removal position, e.g., at one of the longitudinal ends of the mould, the debagging tool is operated to provide a force in a second direction to start removing the infusion tools from the mould. The second direction is preferably substantially opposite the first direction. Thereby, the debagging tool can first be used for peeling the infusion tools from the wind turbine blade part and then later for removing the infusion tools from the wind turbine blade part and the mould.

In another embodiment, the method includes: while removing the infusion tools from the mould, cutting the infusion tools to divide the infusion tools into separate disposable parts. Thereby, the infusion tools are easier to dispose. The separate disposable parts may be collected in a container.

In yet another embodiment, the method comprises the step of: maintaining the debagging tool at a tilt angle below a threshold angle compared to a vertical plane, preferably keeping the tilt angle below 5 degrees or even 3 degrees, more preferably below 2 degrees, and even more preferably below 1.5 degrees.

BRIEF DESCRIPTION OF THE FIGURES

The invention is explained in detail below with reference to embodiments shown in the drawings, in which FIG. 9 illustrates a debagging tool asserting a peeling force to infusion tools, FIG. 11 illustrates the steps used in a method of manufacturing a wind turbine blade part.

DETAILED DESCRIPTION OF THE INVENTION

In the following, a number of exemplary embodiments are described in order to understand the invention.

Figure 1:
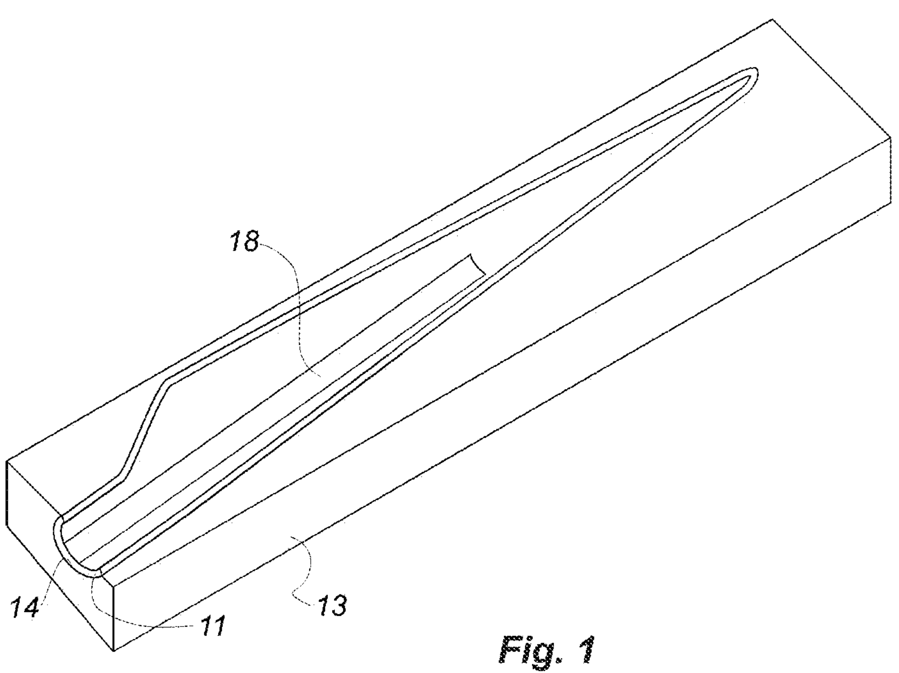
FIG. 1 shows a schematic view of a wind turbine blade mould for moulding a wind turbine blade shell part.

Modern wind turbine blades comprise an aerodynamic shell, and the suction side and the pressure side of the aerodynamic shell are often manufactured as separate parts in separate moulds. FIG. 1 shows a schematic view of a mould part 13 for manufacturing one of the separate wind turbine blade shell parts. The wind turbine blade shell is manufactured as fibre-reinforced composite structures comprising a fibre-reinforcement material embedded in a polymer matrix. The blade shell parts 11 are manufactured separately by arranging the fibre-reinforcement material and typically also sandwich core material, such as foamed polymer or balsawood, on a mould surface 14 of the mould 13. The fibre reinforcement material is laid out as separate fibre mats that are stacked overlapping on the mould surface 14. The load bearing structure of the wind turbine blade may be manufactured as a spar cap 18 integrated in the blade shell, also called a main laminate, with shear webs arranged between the spar caps of the pressure side shell part and the suction side shell part. Alternatively, the load bearing structure may be formed as a spar or a beam, and the aerodynamic shell is adhered to the load bearing structure. The two blade shell parts are also glued to each other, e.g. by use of internal flange parts. The fibre mats may be laid up manually on the mould surface 14 or by use of a fibre mat layup system, in which case the fibre mats may be laid up automatically or semi-automatically.

Figure 2:
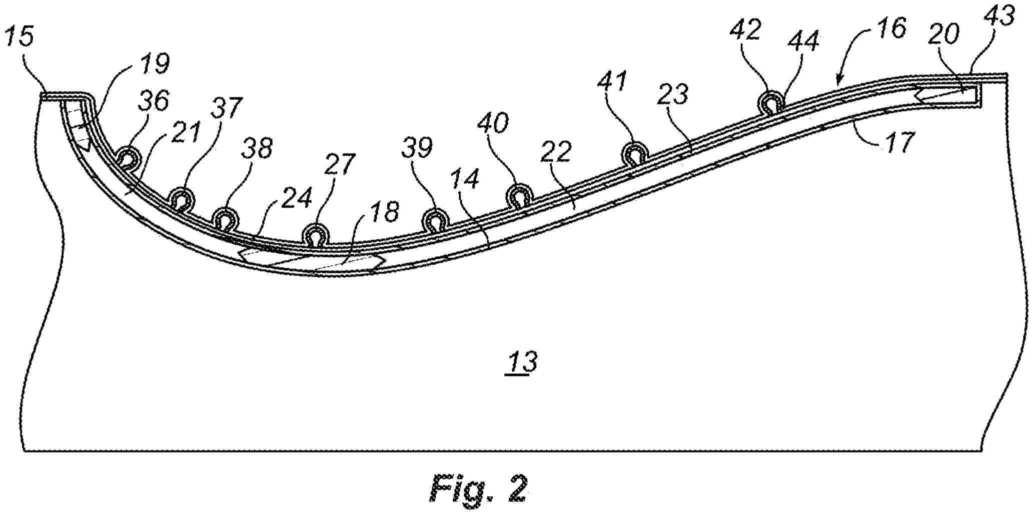
FIG. 2 shows a schematic cross-sectional view through a mould for moulding wind turbine blade shell part.

For manufacturing the blade shell half 11, the rigid mould part 13 is provided with a mould surface 14 forming the outer surface of the shell half, i.e. the pressure side of the blade. FIG. 2 shows a cross-sectional view of the rigid mould part 13 for forming the shell part 11 of the wind turbine blade.

In the following, an example of the lay-up and tools used for manufacturing the blade shell part 11 is described. The mould part 13 is provided with an upper rim 15, as clearly seen in FIG. 2.

A lay-up 16 comprising a number of fibre layers is placed on the mould surface 14. In the embodiment shown, the fibre lay-up 16 comprises first fibre layers 17 arranged directly on the mould surface 14 or optionally with a previously applied gelcoat. On the first fibre layers, a large number of fibre layers are placed in a longitudinally extending zone of the mould so as to provide a load-bearing structure (or spar cap) 18 of the blade shell half. As seen in the transverse direction of the mould, the zone forming the load-bearing structure 18 is provided in the lowermost area of the mould surface. Additionally, a plurality of fibre layers may be arranged on the first lower fibre layers 17 at a region corresponding to the region of the leading edge and the trailing edge, respectively, of the blade shell half to provide a leading edge fibre reinforcement 19 and a trailing edge fibre reinforcement 20. A first core material 21 may be arranged between the load-bearing structure 18 and the leading edge fibre reinforcement 19 and a second core material 22 may be arranged between the load-bearing structure 18 and the trailing edge fibre reinforcement 20. The core material can be a hard polymer foam or balsawood. The fibre lay-up 16 is completed by arranging second fibre layers 23 on top of the load-bearing structure 18, the leading edge fibre reinforcement 19, the trailing edge fibre reinforcement 20, the first core material 21 and the second core material 22. While the core materials 21, 22 are depicted as extending all the way between fibre reinforcements 18, 19, 20, the core materials 21, 22 may be arranged at a limited part of the blade shell only.

Next, a distribution layer 24 is arranged on the second fibre layers 23. Further, substantially longitudinally extending feed channels 36-42 are arranged above the fibre distribution layer 24 on either side of and laterally spaced apart from a longitudinally extending first feed channel 27 arranged above the load-bearing structure 18. Further, the additional feed channels 36-42 are placed laterally outside the load-bearing structure 18. A vacuum bag 43 is arranged on top of the distribution layer 24 and the feed channels and sealed to the rim 15 of the mould part to form a mould cavity 44 between the vacuum bag 43 and the mould surface 14 of the mould part 13. The mould cavity is then evacuated, and resin is supplied to the mould cavity via the feed channels 27, 36-42.

Finally, the resin is allowed to cure in order to form the composite structure of the blade shell part 11, after which a debagging and demoulding process can be commenced in order to finalise the assembly of the wind turbine blade.

The lay-up includes the arrangement of a peel ply, a release film, or a similar tear-off layer (not shown) on top of the inner fibre layers, e.g. arranged below the distribution layer 24. This peel ply or release film ensures that the infusion tools that do not become part of the composite structure can be removed in the debagging process. The infusion tools include the feed channels 27, 36-42, the tear-off layer, the vacuum bag as well as possible vacuum outlet channels. The infusion tools are in the following referred to by common reference number 50.

Figures 3A, 3B, 3C:
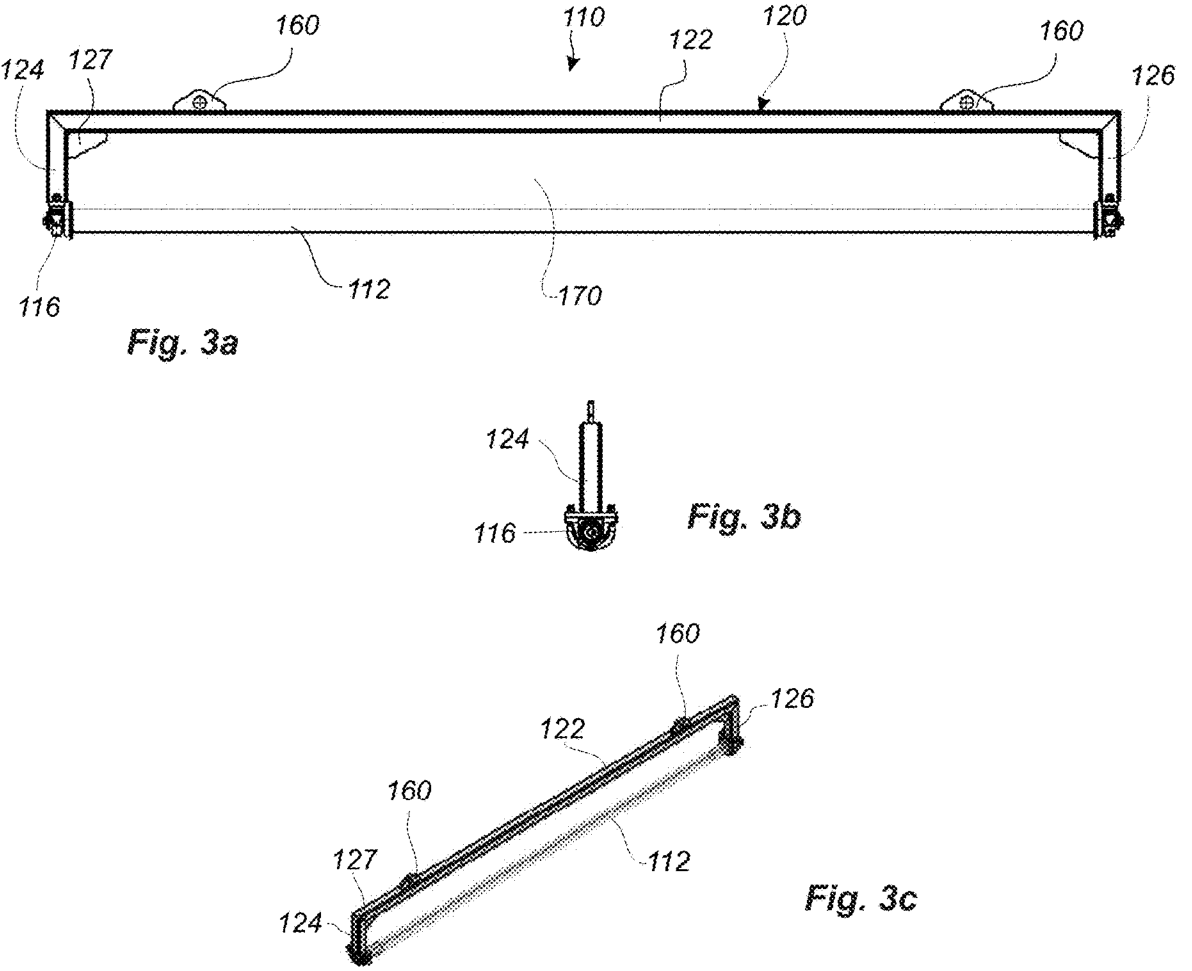
FIGS. 3*a*-3*c* show a front view, a side view, and a perspective view of a first embodiment of a debagging tool.

The debagging process is typically carried out manually, which is a tedious process, and which can entail unsafe conditions and acts. In order to address these problems, a new debagging tool has been developed. A first embodiment of such a debagging tool 110 is illustrated in FIGS. 3*a*-3*c*.

The first embodiment of the debagging tool 110 comprises a support frame 120 for carrying a lifting bar 112 for lifting and carrying the infusion tools during the debagging process. The lifting bar may advantageously be provided in form of a roller or comprise a roller. The support frame 120 comprises a top frame part 122, a first side frame part 124 and a second side frame part 126. The support frame may further be enforced with gussets 127 or other reinforcement elements. The lifting bar 112 is attached at a first end to the first side frame part 124 via attachments means 116. Similarly, the lifting bar 112 is attached at a second end to the second side frame part 126 via corresponding attachments means 116. The attachment means 116 may be formed for instance by bolts, nuts, and holding plates. In addition, the debagging tool 110 has two lifting ears 160 attached to the top frame part 122. The lifting ears 160 can be used for attaching the debagging tool 110 to an overhead crane or gantry via for instance chains and hooks. During the debagging process, the infusion tools 50 are inserted in the space 170 formed between the lifting bar 112 and the support frame 120.

FIGS. 4-7 illustrate the debagging process by use of a debagging system that comprises the debagging tool 110 carried by conveying means 104 in form of an overhead crane or gantry using e.g. chains 102 in order to peel the infusion tools 50 from the cured wind turbine blade shell 11.

In the initial phase of the debagging process, a part of the removable infusion tools 50 is manually peeled from the cured wind turbine shell 11. As shown in the top view in FIG. 4, the removable infusion tools are peeled from the root side of the mould 13 and wind turbine blade shell 11, after which the manually peeled part is loaded onto the space 170 between the lifting bar 112 and the support frame 120 of the debagging tool 110, which is best seen in the front view illustrated in FIG. 6. Subsequently, the debagging tool 110 is moved along the mould part 13 using an overhead crane or gantry 104, thereby lifting the removable infusion tool from the cured blade shell part 11 and mould part 13.

The end of the removable infusion tools 50 needs to be held in place, e.g. by clamping using clamping means 106, to manage the opposite pulling force from the debagging tool 110 and the conveying means, as the debagging tool 110 is moved along the mould part 13.

Figures 4, 5, 6, 7:
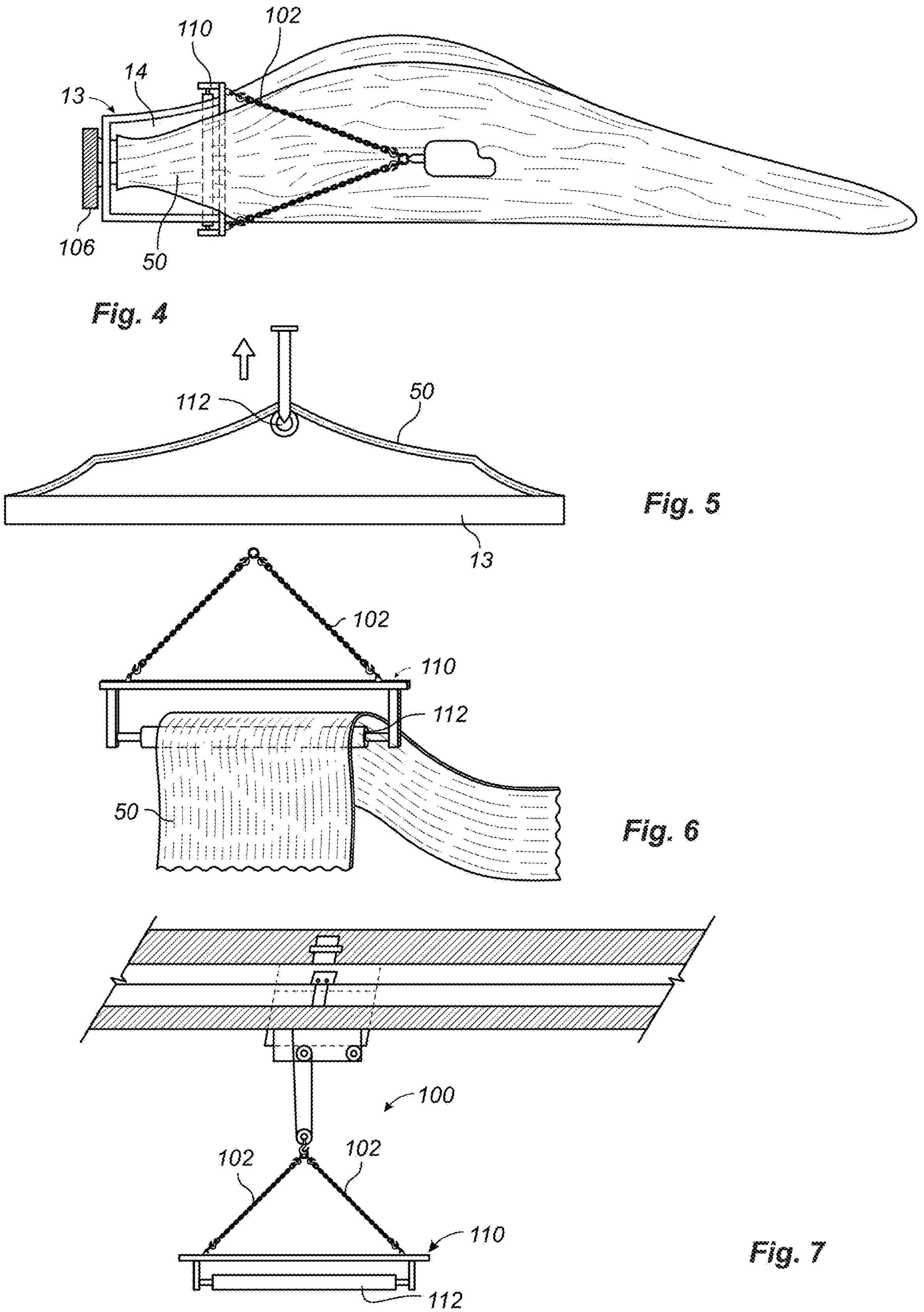
FIG. 4 illustrates a top view of a debagging tool being along a mould for moulding a wind turbine blade shell part during a debagging process.
FIG. 5 illustrates a side view of a debagging tool being along a mould for moulding a wind turbine blade shell part during a debagging process.
FIG. 6 illustrates a front view of a debagging tool being along a mould for moulding a wind turbine blade shell part during a debagging process.
FIG. 7 illustrates conveying means for use with the debagging tool in a debagging system.

In FIG. 4, the manually peeled part of the removable infusion tools 50 is peeled from the root-side of the mould part 13, and the removable infusion tools 50 are held or clamped at the root-side of the mould part 13. However, it is clear that this can alternatively be carried out at the tip-side of the mould part 13.

As shown in FIG. 5, the lifting bar 112 can be moved upwards and forwards, and this movement will peel the removable infusion tools 50 from the cured wind turbine blade shell 11.

As shown in FIG. 7, the debagging tool 110 can be carried by an overhead crane or gantry 104. As illustrated, the system 100 may use a crane or gantry being movable along tracks. As further shown, the debagging tool 110 may be attached to the overhead crane or gantry via chains 102 and hooks. Further, the system may be provided with a hoisting mechanism, such that the debagging tool 110 can be moved both up and down as well as along the longitudinal direction of the mould part 13, such that the required forces can be applied to the removable infusion tools in the debagging process.

As shown, the lifting bar 112 is advantageously be provided in form of or comprising a roller, such that the debagging tool easier can be moved along the mould part 13 in the debagging process without being stuck or tearing the removable infusion tools 50.

A second embodiment of a debagging tool 210 is shown in FIGS. 8*a*-8*e*. The debagging tool 210 comprises a support frame 220 and a lifting bar 212 connected to the support frame for insertion under infusion tools 50 and lifting the infusion tools 50 during the debagging. The support frame 220 comprises a top frame part 222, a first side frame part 224, a second side frame part 226, and a bottom frame part 228. A first end of the lifting bar 212 is coupled to the first side frame part 224, and a second end of the lifting bar 212 is coupled to the second side frame part 226. The support frame 220 may further be enforced with gussets 227 or other reinforcement elements.

The lifting bar 212 may comprise a first roller or be provided as a first roller. The first roller may be connected to a first drive or first motor 214 for driving the first roller. Thus, the first roller can actively be used for asserting a force to the infusion tools and assist in peeling the infusion tools 50 from the finished moulded structure. The first roller may advantageously be configured to be driven in both a first direction and a second, opposite direction. Accordingly, the first roller may be used for both asserting a force in a first direction and a second direction. Thereby, the first roller can also be used for first peeling the infusions tools 50 from the finished moulded structure 14 and later removing the infusion tools 50 from the mould part 13. A surface of the first roller may advantageously be provided with gripping means, e.g., by providing a rough surface or a ridged, fluted, or grooved surface. Thereby, the roller can add grip to the engagement with the infusion tools, which in turn assist in asserting the peeling force to the infusion tools.

Figures 8A, 8B, 8C, 8D, 8E:
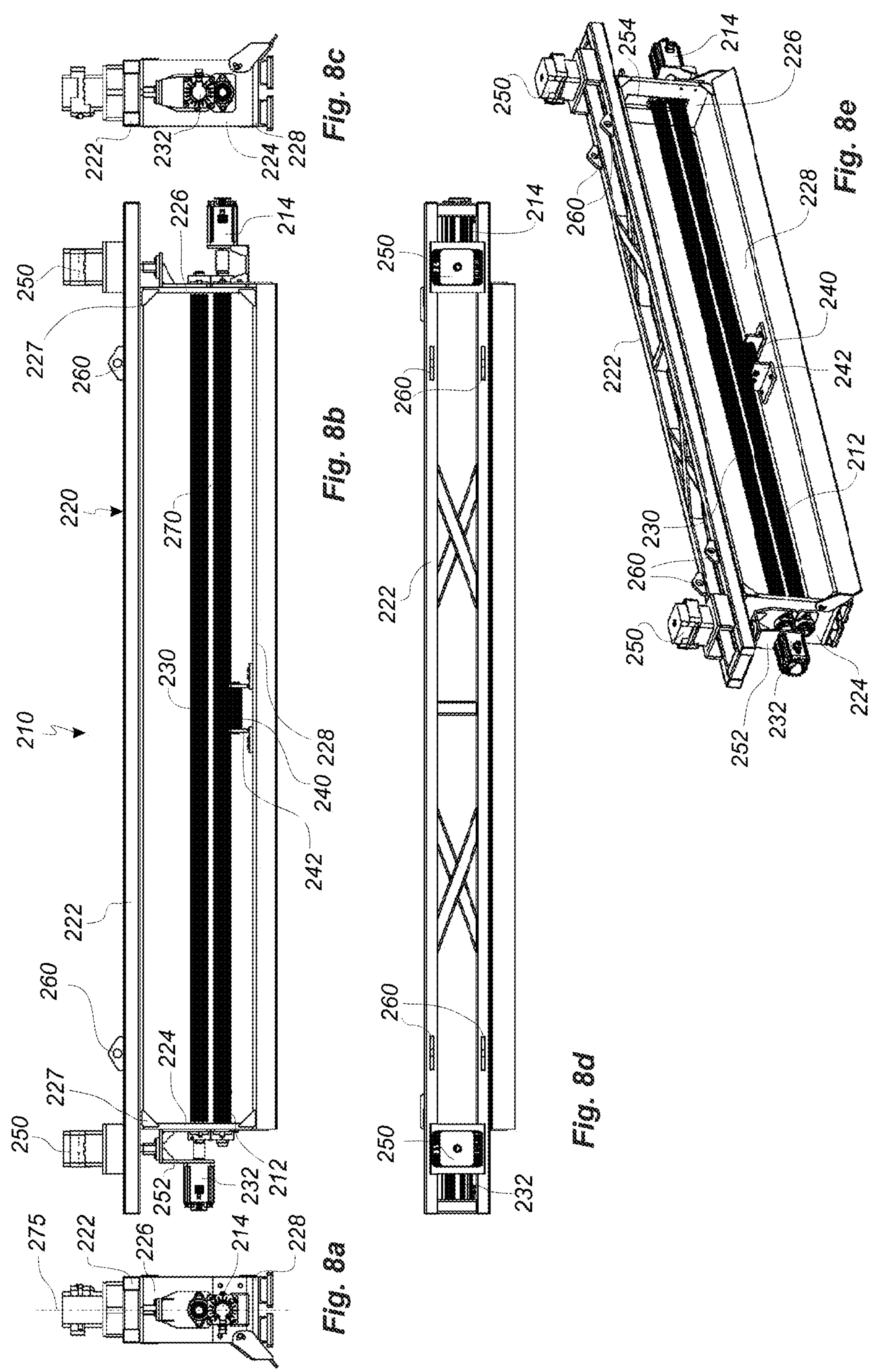
FIGS. 8*a*-8*e* show a first side view, a front view, a second side view, a top view, and a perspective view of a second embodiment of a debagging tool.

As shown in FIGS. 8*b* and 8*e*, the debagging tool 210 may further comprises one or more upper support rollers 230 configured to engage with the infusion tools when lifted by the lifting bar 212. The one or more upper support rollers are coupled to the support frame with a first end coupled to the first side frame part 224 and a second end coupled to the second side frame part 226. This will contribute to guide the infusion tools more efficiently over the lifting bar and may further contribute to asserting a gripping or clamping force on the infusion tools, whereby a pulling force more efficiently can be asserted to the infusion tools. The one or more upper support rollers 230 may also provide with gripping means, e.g., by providing a rough surface or a ridged, fluted, or grooved surface. The one or more upper support rollers 230 are preferably connected to one or more second drives or second motors 232 for driving the one or more upper support rollers 230. Thereby, the one or more upper support rollers 230 can also or alternatively be used to assert the pulling force to the infusion tools 50. Preferably the one or more are configured to be driven in both a first direction and a second, opposite direction. When the first roller 212 and the one or more upper support rollers 230 are both connected to drives or motors, the debagging tool 210 will have the further advantage of having a built-in redundancy in case one of the drives or motors fail. The infusion tools 50 are inserted in the space 270 formed between the lifting bar 212 and the one or more upper rollers 230.

The one or more upper support rollers 230 are preferably as shown in FIG. 8 arranged and configured to be height adjusted relative to the support frame. Thereby, the one or more upper support rollers 230 are also height adjustable relative to the lifting bar 230. This provides a simple solution for engaging the infusion tools 50. The one or more upper support rollers may for instance as shown be height adjustable by one or more motors 250 attached to the support frame 220. The motor(s) 250 can be connected to a spindle or the like, which in turn is attached to frames carrying the one or more upper support rollers 230 as well as the second motor 232. The one or more upper support rollers 230 may be guided along slots 254 formed in the first side frame part 224 and second side frame part 226.

The support frame 220 preferably comprises attachment means 260, such as attachment ears, for attaching the debagging tool 210 to the conveying means 102. This provides simple means for attaching the debagging tool 210 to for instance an overhead crane or a gantry configured to move along the mould part 13. Accordingly, it is seen that the second embodiment of the debagging tool 210 may be suspended from the conveying means in a way similar to that of the first embodiment of the debagging tool 110 and as shown in FIGS. 4-7.

As shown in FIGS. 8*b* and 8*e*, one or more lower support rollers 240, such as idler rollers, are mounted on the lower frame part 228 and arranged and configured to support the lifting bar 212. This provides a simple solution for adding support to the lifting bar 212, e.g., the first roller, on the support frame 220. The one or more lower support rollers 240 may be arranged on a frame 242 mounted on the lower frame part 228 of the support frame 220.

It is clear that the second embodiment of the debagging tool 210 can be suspended and operated in a way similar to those shown in FIGS. 4-7. However, compared to the first embodiment, the second embodiment has the advantage of better asserting a pulling or peeling force to the infusion tools 50 during the debagging process. As illustrated in FIG. 9, the debagging system 100 may be configured to provide a pulling force F in a direction that forms an angle $\alpha$ of 30-60 degrees compared to a mould surface of the mould part 13. Equivalently, the pulling force direction may be 30-60 degrees compared to a horizontal plane, e.g., the factory floor. The direction of the pulling force may be provided by the height at which the debagging tool 210' is moved along the mould. Accordingly, the debagging system should be configured and operational to convey the debagging tool 210' along the mould at a height above the mould surface to provide a pulling force within this angle interval. The speed with which the debagging tool is moved along the mould and the speed of the roller or rollers 212', 230' that assert the pulling force can also attribute to achieving the desired pulling angle.

The debagging system 100 or the debagging tool 210 may provided with a tilt sensor to monitor the inclination or tilt of the debagging tools relative to a mould surface of the mould. The tilt sensor may be provided in form of an inclinometer, accelerometers, gyros, or the like. This ensures that the debagging tool may be maintained in an acceptable orientation relative to the surface of the mould and in turn ensure that the correct pulling force and direction may be maintained. The debagging system may be configured to maintain the debagging tool at a tilt angle being below a threshold angle compared to a vertical plane, preferably the system being configured to keep the tilt angle below 5 or even below 3 degrees, more preferably below 2 degrees, and even more preferably below 1.5 degrees. The angle can be based for instance on a longitudinal axis 275 extending through the debagging tool 210 as shown in FIG. 8*a*.

In another embodiment, the debagging system further comprises a cutting device (not shown) for cutting the infusion tools to divide the infusion tools into separate disposable parts. Accordingly, the infusion tools may be divided into smaller parts as it is removed from the mould. The system may additionally comprise a container for collecting the separate disposable parts.

For both embodiments of the debagging tool, the width of the lifting bar may advantageously be at least 3 metres, preferably at least 3.5 metres, and more preferably at least 4 metres. In general, the lifting bar and the system should have a width so that it can be used for debagging the infusion tools at the place where the mould and moulded structure is widest. For a wind turbine blade shell part, this position is the position, where the wind turbine blade is to have the widest chord, e.g., at the shoulder of the wind turbine blade.

Figure 10:
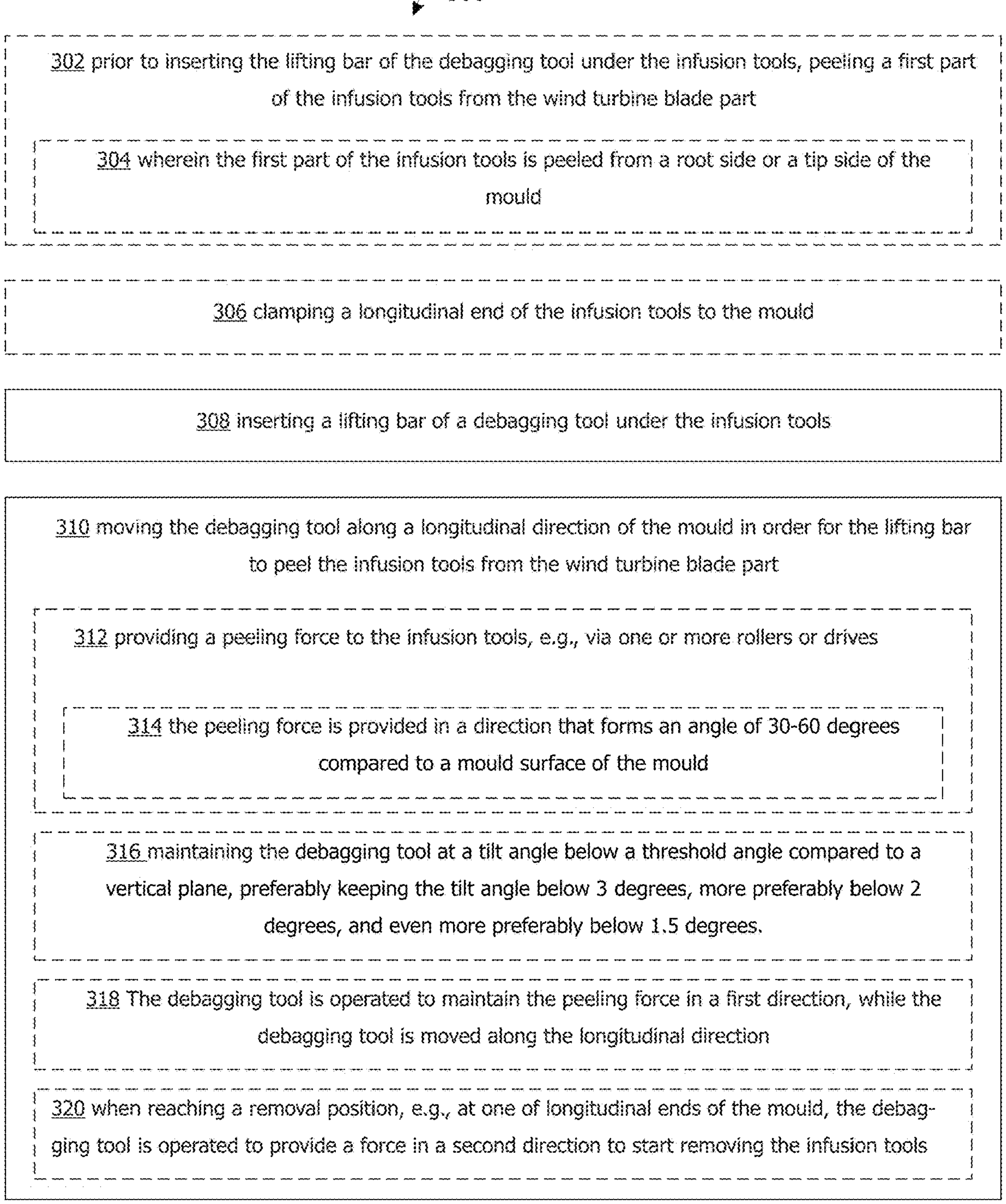
FIG. 10 illustrates the steps used a method for debagging infusion tools during the manufacture of a wind turbine blade part in a mould for manufacturing the wind turbine blade part.

FIG. 10 shows a method 300 for debagging infusion tools during the manufacture of a wind turbine blade part in a mould for manufacturing the wind turbine blade part. In a first step 302, a first part of the infusion tools is peeled manually from the wind turbine blade part. As mentioned in step 304, the first part may for instance be peeled from a root side or tip side of the mould. The lifting bar is then inserted under the infusion tools at the manually peeled first part in step 307 and a longitudinal end of the infusion tools is clamped to the mould part in step 306. The debagging tool is then in step 310 moved along a longitudinal direction of the mould in order for the lifting bar to peel the infusion tools from the finished wind turbine blade part. During step 310, a peeling for may be provided to the infusion tools, for instance via one or more rollers as shown in step 312. The peeling force may be provided in a direction that forms an angle of 30-60 degrees compared to a mould surface of the mould or alternatively a horizontal surface as shown in step 314. Further, during step 310, the debagging tools may as shown in step 316 be maintained at a tilt angle below a threshold angle compared to a vertical plane, preferably keeping the tilt angle below 4 degrees or even below 3 degrees, more preferably below 2 degrees, and even more preferably below 1.5 degrees As shown in step 318, the debagging tool may be operated to maintain the peeling force in a first direction, while the debagging tool is moved along the longitudinal direction, and when reaching a removal position, e.g., at one of longitudinal ends of the mould, the debagging tool is in step 320 operated to provide a force in a second direction to start removing the infusion tools from the mould. The infusion tools are then in step 322 removed from the mould. During step 322, the infusion tools may be cut in to divide the infusion tools into separate disposable parts, which can be collected in a container to easier dispose of the disposable infusion tools.

FIG. 11 shows a method 400 of manufacturing a wind turbine blade part, e.g., a wind turbine blade shell or a spar cap. In a first step 402, a mould for manufacturing the wind turbine blade part is provided. Then in a next step 404, fibre reinforcement material is arranged on a mould surface of the mould. In the next step 406, infusion tools are arranged on top of the fibre reinforcement material, where the infusion tools comprise at least a vacuum bag. Then, in step 408, the vacuum bag is sealed against the mould to form a mould cavity. Afterwards, in step 410, resin is supplied into the mould cavity. Then, in step 412, the resin is cured to form the wind turbine blade part. Finally, the aforementioned debagging method 300 is carried out in order to remove the infusion tools from the finished wind turbine blade part.

EXEMPLARY EMBODIMENTS

Exemplary embodiments of the present disclosure are set out in the following items:

1. A debagging system (100) for use in a debagging process during the manufacture of a wind turbine blade, wherein the debagging system comprises:
   a debagging tool (110, 210), and
   conveying means (104) configured to moving the debagging tool along a longitudinal direction of a mould for manufacturing a wind turbine blade part,
   wherein the debagging tool (110, 210) comprises:
      a lifting bar (112, 212) for insertion under infusion tools (50) and lifting the infusion tools (50) during the debagging process, the lifting bar (112, 212) having a first end and a second end, and
      a support frame (120, 220) for carrying the lifting bar,
      wherein the lifting bar (112, 212) is coupled to the support frame (120, 220), and
   wherein the debagging tool is suspended from the conveying means so that the debagging tool during use can be arranged above the mould and be moved along the longitudinal direction of the mould.
2. The debagging system of item 1, wherein the lifting bar (112, 212) comprises a first roller.
3. The debagging system of item 2, wherein the first roller is connected to a first drive or motor (214) for driving the first roller.
4. The debagging system of item 3, wherein the first roller is configured to be driven in both a first direction and a second, opposite direction.
5. The debagging system of any of items 2-4, wherein a surface of the first roller is provided with gripping means, e.g. by providing a rough surface or a ridged, fluted, or grooved surface.
6. The debagging system of any of items 1-5, wherein the lifting bar (112, 212) is coupled to the support frame (120, 220) at the first end and at the second end of the lifting bar (112, 212).
7. The debagging system of any of items 1-6, wherein the support frame comprises attachment means (160, 260), such as attachment ears, for attaching the debagging tool to conveying means, such as an overhead crane or a gantry.
8. The debagging system of any of items 1-7,
   wherein the support frame comprises a top frame part (122, 222) and a first side frame part (124, 224) and a second side frame part (126, 226), wherein the first side frame part (124, 224)
   and second side frame part (126, 226) extend from the top frame part (122, 222), and wherein the first end of the lifting bar (112, 212) is coupled to the first side frame part (124, 224), and the second end of the lifting bar (112, 212) is coupled to the second side frame part (126, 226).
9. The debagging system of any of items 1-8, wherein the debagging tool further comprises one or more upper support rollers (230) configured to engage with the infusion tools when lifted by the lifting bar (112, 212), wherein the one or more upper support rollers are coupled to the support frame (120, 220).
10. The debagging system of item 9, wherein the one or more upper support rollers (230) are arranged and configured to be height adjusted relative to the support frame (120, 220).
11. The debagging system of any of items 9-10, wherein the one or more upper support rollers (230) are connected to one or more second drives or motors (232) for driving the one or more upper support rollers (230).
12. The debagging system of any of items 9-11 and item 2, wherein both the first roller and the one or more upper support rollers (230) are connected to drives or motors.
13. The debagging system of any of items 1-12, wherein the support frame (120, 220) further comprises a lower frame part (228).
14. The debagging system of any of item 13, wherein one or more lower support rollers (240), such as idler rollers, are mounted on the lower frame part (228) and arranged and configured to support the lifting bar (112, 212).
15. The debagging system of any of items 1-14, wherein the width of the lifting bar is at least 3 metres, preferably at least 3.5 metres, and more preferably at least 4 metres.
16. The debagging system of any of items 1-15, wherein the conveying means comprise an overhead crane or gantry.
17. The debagging system of any of items 1-16, wherein the debagging system is configured to provide a pulling force in a direction that forms an angle of 30-60 degrees compared to a mould surface of the mould.

18. The debagging system of any of items 1-17, wherein the debagging system is provided with a tilt sensor to monitor the inclination or tilt of the debagging tools relative to a mould surface of the mould.

19. The debagging system of item 18, wherein the debagging system is configured to maintain the debagging tool at a tilt angle being below a threshold angle compared to a vertical plane, preferably the system being configured to keep the tilt angle below 5 degrees or even below 3 degrees, more preferably below 2 degrees, and even more preferably below 1.5 degrees.

20. The debagging system of any of items 1-19, wherein the debagging system further comprises: a clamping device for clamping a part, preferably an end part, of the infusion tools to the mould.

21. The debagging system of any of items 1-20, wherein the debagging system further comprises: a cutting device for cutting the infusion tools to divide the infusion tools into separate disposable parts.

22. A debagging tool (110, 210) for use in a debagging process during the manufacture of a wind turbine blade, wherein the debagging tool (110, 210) comprises:

a lifting bar (112, 212) for insertion under infusion tools (50) and lifting the infusion tools (50) during the debagging process, the lifting bar (112, 212) having a first end and a second end, and a support frame (120, 220) for carrying the lifting bar, wherein the lifting bar (112, 212) is coupled to the support frame (120, 220).

23. A method for debagging infusion tools during the manufacture of a wind turbine blade part in a mould for manufacturing the wind turbine blade part, wherein the method comprises the steps of:

inserting a lifting bar of a debagging tool under the infusion tools;

moving the debagging tool along a longitudinal direction of the mould in order for the lifting bar to peel the infusion tools from the wind turbine blade part; and removing the infusion tools from the mould.

24. The method according to item 23, wherein the method comprises the step of:

prior to inserting the lifting bar of the debagging tool under the infusion tools, peeling a first part of the infusion tools from the wind turbine blade part.

25. The method according to item 24, wherein the first part of the infusion tools is peeled from a root side or a tip side of the mould.

26. The method according to any of items 23-25, wherein the method comprises the step of: clamping a longitudinal end of the infusion tools to the mould.

27. The method according to any of items 23-26, wherein the method comprises the step of: providing peeling force to the infusion tools, e.g., via one or more rollers and drives.

28. The method according to item 28, wherein the peeling force is provided in a direction that forms an angle of 30-60 degrees compared to a mould surface of the mould.

29. The method according to any of items 27-28, wherein The debagging tool is operated to maintain the peeling force in a first direction, while the debagging tool is moved along the longitudinal direction, and when reaching a removal position, e.g., at one of longitudinal ends of the mould, the debagging tool is operated to provide a force in a second direction to start removing the infusion tools from the mould.

30. The method according to item 29, wherein the method comprises the step of:

while removing the infusion tools from the mould, cutting the infusion tools to divide the infusion tools into separate disposable parts.

31. The method according to any of items 23-30, wherein the method comprises the step of:

maintaining the debagging tool at a tilt angle below a threshold angle compared to a vertical plane, preferably keeping the tilt angle below 5 degrees or even below 3 degrees, more preferably below 2 degrees, and even more preferably below 1.5 degrees.

32. A method of manufacturing a wind turbine blade part, e.g., a wind turbine blade shell or a spar cap, wherein the method comprises the steps of:

proving a mould for manufacturing the wind turbine blade part;

arranging fibre reinforcement material on a mould surface of the mould;

arranging infusion tools on top of the fibre reinforcement material, the infusion tools comprising a vacuum bag;

sealing the vacuum bag against the mould to form a mould cavity;

supplying resin into the mould cavity;

curing the resin to form the wind turbine blade part; and carrying out a debagging process according to any of items 23-31.

LIST OF REFERENCE NUMERALS

11 blade shell half
13 mould part
14 mould surface
15 upper rim
16 fibre lay-up
17 first fibre layers
18 load-bearing structure
19 leading edge fibre reinforcement
20 trailing edge fibre reinforcement
21 first core material
22 second core material
23 second fibre layers
24 distribution layer
27 first feed channel/first resin inlet
36-42 additional feed channel
43 vacuum bag
44 mould cavity
50 infusion tools
100 debagging system
102 chains
104 conveying means/overhead crane/gantry
106 clamping means
110, 210 debagging tool
112, 212 lifting bar/first roller
214 first drive/first motor
116 attachment means
120, 220 support frame
122, 222 top frame part
124, 224 first side frame part
126, 226 second side frame part
127, 227 reinforcement element/gusset
228 bottom frame part
230 upper support roller
232 second drive/second motor 240 lower support rollers
242 frame for lower support rollers
250 height adjustment drive/motors
252 attachment frame
254 slot
160, 260 attachment means/lifting ears
170, 270 space for inserting infusion tools
275 vertical axis

The invention claimed is:

1. A system for use in a debagging process during the manufacture of a wind turbine blade, the system comprising:
 a wind turbine blade shell mould;
 a debagging tool;
 conveying means configured to move the debagging tool along a longitudinal direction of the mould for manufacturing a shell component of the wind turbine blade,
 wherein the debagging tool comprises:
  a lifting bar, the lifting bar comprising a first roller for insertion under one or more infusion tools and lifting the one or more infusion tools during the debagging process, the lifting bar having a first end and a second end;
  a support frame for carrying the lifting bar, wherein the lifting bar is coupled to the support frame;
  an upper support roller coupled to the support frame above the first roller such that the one or more infusion tools are inserted in a space defined between the first roller and the upper support roller when lifted by the lifting bar; and
  wherein the debagging tool is suspended from the conveying means so that the debagging tool is arranged above the mould and moved along the longitudinal direction of the mould.

2. The system of claim 1, wherein the first roller is connected to a first drive or motor for driving the first roller.

3. The system of claim 2, wherein the first roller is configured to be driven in both a first direction and a second, opposite direction.

4. The system of claim 1, wherein the lifting bar is coupled to the support frame at the first and second ends of the lifting bar.

5. The system of claim 1, wherein the support frame comprises attachment means for attaching the debagging tool to the conveying means.

6. The system of claim 1, wherein the support frame comprises a top frame part, a first side frame part, and a second side frame part, wherein the first side frame part and the second side frame part extend from the top frame part, and wherein the first end of the lifting bar is coupled to the first side frame part and the second end of the lifting bar is coupled to the second side frame part.

7. The system of claim 1, wherein the upper support roller is adjustable in height relative to the lifting bar.

8. The system of claim 1, wherein the first roller is connected to a first drive or motor and the upper support roller is connected to a second drive or motor.

9. The system of claim 1, wherein the support frame further comprises a lower frame part, and wherein a lower support roller is mounted on the lower frame part and arranged and configured to support the lifting bar.

10. The system of claim 1, wherein the conveying means comprise an overhead crane or gantry.

11. The system of claim 1, further comprising a tilt sensor to monitor an inclination or tilt of the debagging tool relative to a surface of the mould so that the debagging tool can be maintained below a threshold tilt angle compared to a vertical plane.

12. The system of claim 1, further comprising one or both of a clamping device for clamping a part of the one or more infusion tools to the mould and a cutting device for cutting the one or more infusion tools into separate disposable parts.

13. A system for use in a debagging process during the manufacture of a wind turbine blade, the system comprising:
 a wind turbine blade shell mould;
 a debagging tool;
 conveying means configured to move the debagging tool along a longitudinal direction of the mould for manufacturing a shell component of the wind turbine blade,
 wherein the debagging tool comprises:
  a lifting bar, the lifting bar comprising a first roller for insertion under one or more infusion tools and lifting the one or more infusion tools during the debagging process, the lifting bar having a first end and a second end;
  a support frame for carrying the lifting bar, wherein the lifting bar is coupled to the support frame;
  the support frame further comprising a lower frame part, and a lower support roller mounted on the lower frame part and arranged and configured to support the lifting bar; and
  wherein the debagging tool is suspended from the conveying means so that the debagging tool is arranged above the mould and moved along the longitudinal direction of the mould.

* * * * *